INVENTORS
GEORGE G. HIEMENZ
LEO ZELIGOWSKY
BY
ATTORNEY

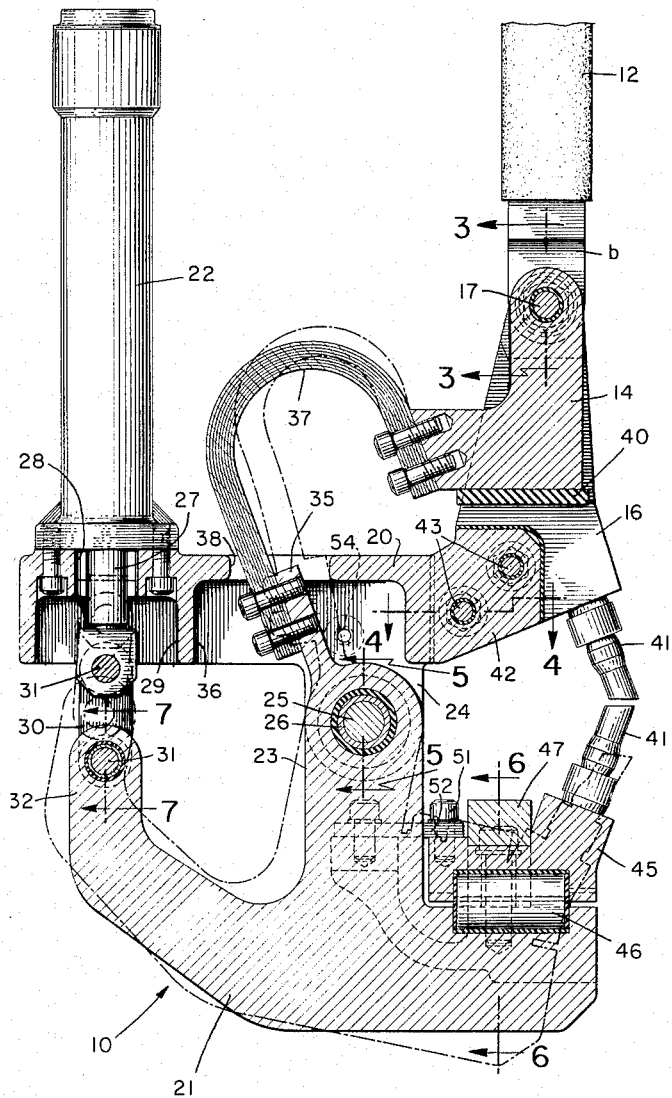
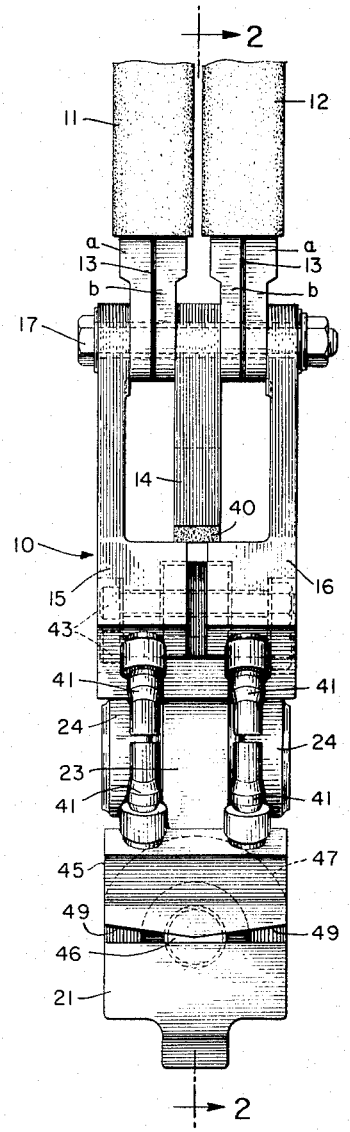
Fig. 2
Fig. 1
INVENTORS
GEORGE G. HIEMENZ
LEO ZELIGOWSKY
BY
Douglas R. McKechnie
ATTORNEY

United States Patent Office 3,205,337
Patented Sept. 7, 1965

3,205,337
PORTABLE WELDING GUN
George G. Hiemenz, Philadelphia, and Leo Zeligowsky, Narberth, Pa., assignors to The Budd Company, Philadelphia, Pa., a corporation of Pennsylvania
Filed May 28, 1964, Ser. No. 371,035
6 Claims. (Cl. 219—87)

This invention relates to a portable welding gun and, more particularly, to a welding gun having two or more sets of electrodes for producing more than one weld at a time.

As is well known, a portable welding gun is a device used for spot welding. The gun is customarily suspended by a cable and is moved manually into position for welding. The gun is only a portion of a complete welding machine that includes, in addition to the gun, equipment for supplying and controlling electrical energy supplied to the gun and hydraulic pressure supplied to the gun for developing the clamping force needed for spot welding.

One of the objects of the invention is to provide a portable welding gun with multiple electrodes, the gun having divided conductive paths for supplying current to the workpiece in such a manner that each weld is formed under substantially identical conditions.

Another object is to provide a strong, compact, multiple-electrode, portable welding gun.

Still another object is to provide a portable welding gun that simultaneously produces a plurality of welds and, hence, provides increased weld rates.

Other objects and advantages of the invention will be apparent from the following description taken in connection with the accompanying drawings wherein:

FIG. 1 is a front elevational view of a welding gun embodying the invention;

FIG. 2 is a vertical sectional view along reference lines 2—2 of FIG. 1; and

Figure 6:
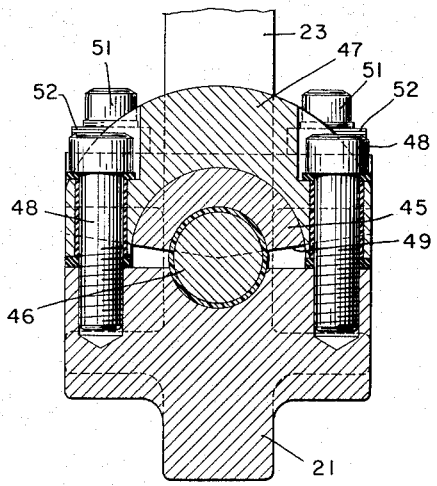
FIGS. 3-7 are enlarged, sectional detail views along reference lines 3—3 through 7—7 of FIG. 2.
Figure 3:
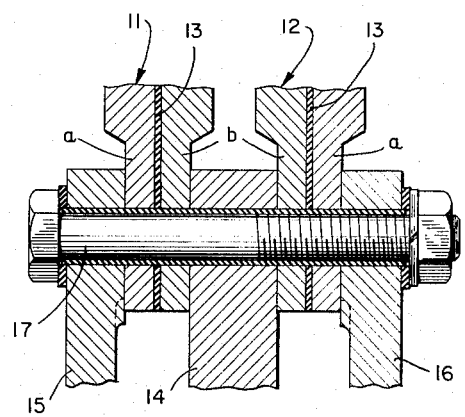

Referring now to the drawings, there is shown a portable welding gun 10 connected to electric cables 11 and 12. Each cable has two conductors which terminate in connectors $a$ and $b$ that are separated and insulated from each other by suitable electric insulation 13.

Electric insulation is used throughout the gun to insulate certain parts described hereafter. Since such insulation is clearly shown in the drawings and it is represented by conventional, recommended section lines, specific reference numerals therefore are hereafter omitted for clarity of illustration.

Connectors $b$ of cables 11 and 12 are adjacent each other and sandwich the upper end of a bus bar 14 therebetween whereby current can readily flow from the bus bar to the connectors $b$, or vice versa. Connectors $a$ are disposed away from each other. The outside surfaces of conductors $a$ engage the inside surfaces of the upper ends of electrode holders 15 and 16. A nut and bolt assembly 17 passes through suitable apertures and connects the cables to the gun, the assembly being insulated from the associated conducting elements.

Figure 5:
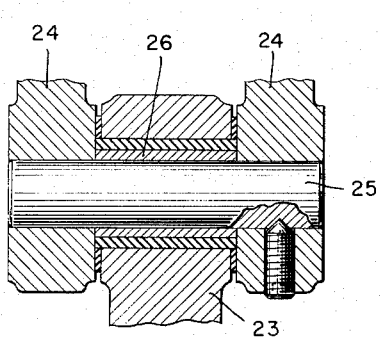

Gun 10 further comprises hinged jaws 20 and 21 that are actuated by a conventional hydraulic cylinder 22. Jaw 21 has a medial upstanding arm 23 straddled by two, medial, dependent arms 24 of jaw 20. A pivot pin 25 affixed to one of arms 24, extends through these arms and arm 23 is insulated from pin 25 and arms 24 by an insulated bushing 26 (FIG. 5).

Cylinder 22 is mounted on top of the rear of jaw 20 and includes a piston rod 27 that extends downwardly through an aperture 28 and through a larger, downwardly opening recess 29. Rod 27 is connected by two links 30 and pins 31 to the upper end 32 of a rearwardly and upwardly extending portion of jaw 21. End 32 is insulated from the links 30 and associated pin 31. Cylinder 22 is operative to move jaw 21 relative to jaw 20 between the open position indicated by the phantom lines and the closed position indicated by the full lines in FIG. 2.

An ear 35 projects from arm 23 into a cup-shaped recess 36 on the underside of jaw 20 and is connected to one end of an inverted, U-shaped conductor or strap 37 that is formed of laminated, flat, conductive strips. Strap 37 extends upwardly through an aperture 38 and has its other end connected to the rear of bus bar 14. The forward edge of aperture 38 is adapted to abut ear 35 and act as a stop member in the open position of the jaws.

Figure 4:
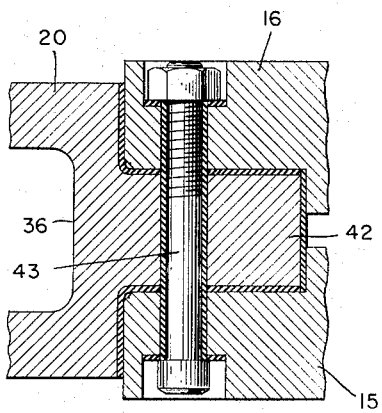
Figure 7:
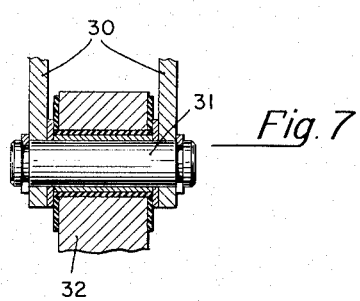

Bus bar 14 lies between the upper ends of holders 15 and 16 and has attached to its underside a rubber bumper 40 that lies on top of enlarged lower portions of the holders. Bumper 40 can be bonded to the holders, if desired. Each holder supports a conventional electrode assembly 41. Jaw 20 comprises a forwardly projecting portion 42 that is connected to electrode holders 15 and 16 by bolts 43. As best seen in FIGS. 2 and 4, the holders straddle portion 42 and are insulated from it, from bolts 43 and from each other.

Portion 42 overlies a forwardly projecting portion of jaw 21 upon which is mounted an electrode holder 45 that supports two lower electrode assemblies 41 in alignment with the upper electrodes. Holder 45 rests on an insulated, greased cylindrical bearing 46 and is held thereon by an arcuate bridge 47 that extends over the holder and is connected to jaw 21 by screws 49. The undersides of holder 45 are undercut at 49 to allow the holder to rotate within the limits of the undercuts through an angular displacement to permit the electrodes to accommodate to bent, angular or unevenly thick workpieces. The axis of such movement lies between the lower electrodes and extends longitudinally of the lower jaw. The rear sides of holder 45 are connected by screws 51 to flexible conductor straps 52 that have their other ends connected to the sides of the lower portion of arm 23. If desired, bearing 46 need not be insulated. Under such conditions, the electricity will still flow substantially along the conductive path described below because it is the path of least resistance. In operation, it is intended that the gun 10 be supported by a suitable cable or hanger connected to the gun at hole 54 (FIG. 2) and that the various conductive portions of the gun, which tend to overheat as a result of the flow current, be provided with coolant chambers through which a cooling liquid, such as water, can flow, as is the usual practice. Preferably, the conductive portions are of a cast, highly conductive material, such as a suitable copper alloy.

During operation, the gun is positioned manually adjacent to a workpiece, as by grasping the lower jaw adjacent the rear thereof and the welding machine is actuated to initiate a welding cycle. In accordance with this cycle, hydraulic pressure is first supplied to cylinder 22 causing jaw 21 to pivot relative to jaw 20 from the open position to the closed position and thereby clamp the workpiece between electrodes 41. The swivel action of electrode holder 45 develops equal pressures between the electrodes. At the end of the spot weld cycle, the cylinder returns the jaws to their open position.

During the "weld" portion of the cycle, current is supplied to the welding gun through cables 11 and 12. The instantaneous flow of current is as follows. Assuming conductors $a$ to be positive and that current flows from positive to negative, current flows from connectors $a$ to cables 11 and 12, into electrode holders 15 and 16 respectively, through upper electrode assemblies 41, through the workpiece, and through the lower electrode assemblies 41 into the electrode holder 45. Then, the current flows through straps 52 into arm 23, strap 37, bus bar 14 and connectors *b* of cables 11 and 12. It should be noted that none of the current flows through the upper jaw 20 which is completely insulated from the current carrying members and that the flow of current through electrode holders 15 and 16 is along separate parallel paths. It is not until the current has passed through the workpiece that the respective paths of flow are combined in the gun. Of course, when the polarity is reversed, current flows in reverse to the paths described above.

While only a single embodiment has been illustrated, it will be apparent to those skilled in the art that changes can be made in the details and arrangement of parts without departing from the scope of the invention as defined in the appended claims.

What is claimed is:

1. A portable welding gun comprising: first and second jaws pivotally connected to and electrically insulated from each other; three conductive connector means pivotally mounted on said first jaw and electrically insulated therefrom and from each other, said connector means being adapted to be connected to cable means for supplying current to said gun; two electrode holders connected to two of said connector means and mounted on said first jaw; an electrode holder mounted on said other jaw and insulated therefrom; and conductor means electrically connecting the remaining connector means to said electrode holder mounted on said second jaw.

2. A welding gun comprising: a first jaw; a second jaw pivotally mounted on said first jaw and electrically insulated therefrom; actuating means for pivoting said jaws relative to each other; a first electrode holder mounted on said second jaw; more than one electrode assembly mounted on said first electrode holder; a second electrode holder mounted on said first jaw and insulated therefrom; an electrode assembly mounted on said second electrode holder; at least one more electrode holder mounted on said first jaw and insulated therefrom, and from said second electrode holder; a bus bar mounted on said first jaw adjacent to said electrode holders mounted thereon and electrically insulated therefrom; a strap electrically connecting said bus bar to said second jaw; and strap means electrically connecting said second jaw to said first electrode holder.

3. A welding gun in accordance with claim 2 wherein said first electrode holder is mounted on said second jaw by mounting means that allows said first electrode holder to rotate through a limited arc relative to said first jaw.

4. A welding gun in accordance with claim 3 wherein said jaws are pivoted at medial portions thereof and said first electrode holder is mounted on one end of said second jaw for rotation about an axis that extends longitudinally of said first jaw.

5. A portable welding gun comprising: first and second jaws hinged together at medial positions thereof; hydraulic cylinder means for moving said jaws between open and closed positions; first means electrically insulating said jaws from each other; first and second electrode holders mounted on said first jaw; second means electrically insulating said first and second electrode holders from each other and from said first jaw; first and second electrodes mounted respectively on said first and second electrode holders and spaced from each other; first and second connectors integral with said first and second electrode holders; a third electrode holder; third and fourth electrodes mounted on said third electrode holder in alignment with said first and second electrodes; third means connecting said third electrode holder to said second jaw; a third connector disposed between said first and second connectors whereby all of said connectors are adapted to be connected to conductors to supply electricity to said gun; and a flexible conductor connecting said third connector to said second jaw.

6. A welding gun in accordance with claim 5 wherein said first and third electrodes are laterally spaced from said second and fourth electrodes a predetermined distance, and said third means comprises a swivel bearing that mounts said third electrode holder for rotation through a limited arc about a longitudinal axis that lies between said third and fourth electrodes.

References Cited by the Examiner
UNITED STATES PATENTS

| 1,779,365 | 10/30 | Von Henke | 219—89 |
| 1,869,448 | 8/32 | Woodring | 219—78 |
| 2,302,748 | 11/42 | DaRoza et al. | 219—89 |
| 2,341,458 | 2/44 | Martin | 219—89 |
| 2,341,459 | 2/44 | Martin | 219—89 |
| 2,927,192 | 3/60 | Plummer | 219—89 |

FOREIGN PATENTS 474,473  11/37  Great Britain.

RICHARD M. WOOD, *Primary Examiner.*